United States Patent
Späth et al.

[19]

[11] Patent Number: 6,137,102
[45] Date of Patent: Oct. 24, 2000

[54] OPTOELECTRONIC SENSOR MODULE

[75] Inventors: Werner Späth, Holzkirchen; Werner Kuhlmann, München; Hans-Ludwig Althaus, Lappersdorf; Wolfgang Gramann, Regensburg, all of Germany

[73] Assignee: Siemens Aktiengesellschaft, Munich, Germany

[21] Appl. No.: 09/343,430

[22] Filed: Jun. 30, 1999

Related U.S. Application Data

[63] Continuation of application No. PCT/DE98/03186, Oct. 30, 1998.

[30] Foreign Application Priority Data

Oct. 31, 1997 [DE] Germany ............................ 197 48 324

[51] Int. Cl.$^7$ .................................................. H01L 31/00
[52] U.S. Cl. ......................... 250/214.1; 250/216; 257/82; 369/44.14
[58] Field of Search ................................. 250/216, 214.1, 250/214 R; 257/432, 80–82; 369/44.14, 44.11

[56] References Cited

U.S. PATENT DOCUMENTS

| | | | |
|---|---|---|---|
| 4,958,245 | 9/1990 | Roth et al. ............................... | 369/120 |
| 5,396,061 | 3/1995 | Taniguchi et al. ...................... | 250/216 |

FOREIGN PATENT DOCUMENTS

| | | |
|---|---|---|
| 0 199 565 A3 | 10/1986 | European Pat. Off. . |
| 0 577 197 A1 | 1/1994 | European Pat. Off. . |
| 0 740 294 A1 | 10/1996 | European Pat. Off. . |
| 0 753 851 A2 | 1/1997 | European Pat. Off. . |

OTHER PUBLICATIONS

International Patent Application WO97/39448 (Ikeuchi), dated Apr. 16, 1997.
Japanese Patent Abstract No. 61082388 (Tsutomu), dated Apr. 25, 1986.
Japanese Patent Abstract No. 01046243 (Hiroshi), dated Feb. 20, 1989.
Japanese Patent Abstracts No. 06036338 (Hidehiro), dated Feb. 10, 1994.
Japanese Patent Abstract No. 06162699 (Kenji), dated Jun. 10, 1994.
Japanese Patent Abstract No. 08007321 (Etsushi), dated Jan. 12, 1996.

*Primary Examiner*—Que T. Le
*Attorney, Agent, or Firm*—Herbert L. Lerner; Laurence A. Greenberg; Werner H. Stemer

[57] ABSTRACT

An optoelectronic sensor module is provided for recognition of reflection patterns on a magnetic data carrier. A laser component having a laser radiation axis, at least a first sensor photodetector laterally displaced relative to the laser radiation axis, electrically conducting bond pads and mutually electrically insulated conducting paths, are disposed on or in a silicon submount or cooling element. A lens configuration which is provided at a side of the laser emitter component opposite the cooling element, is fixed on the cooling element by at least one supporting web.

11 Claims, 3 Drawing Sheets

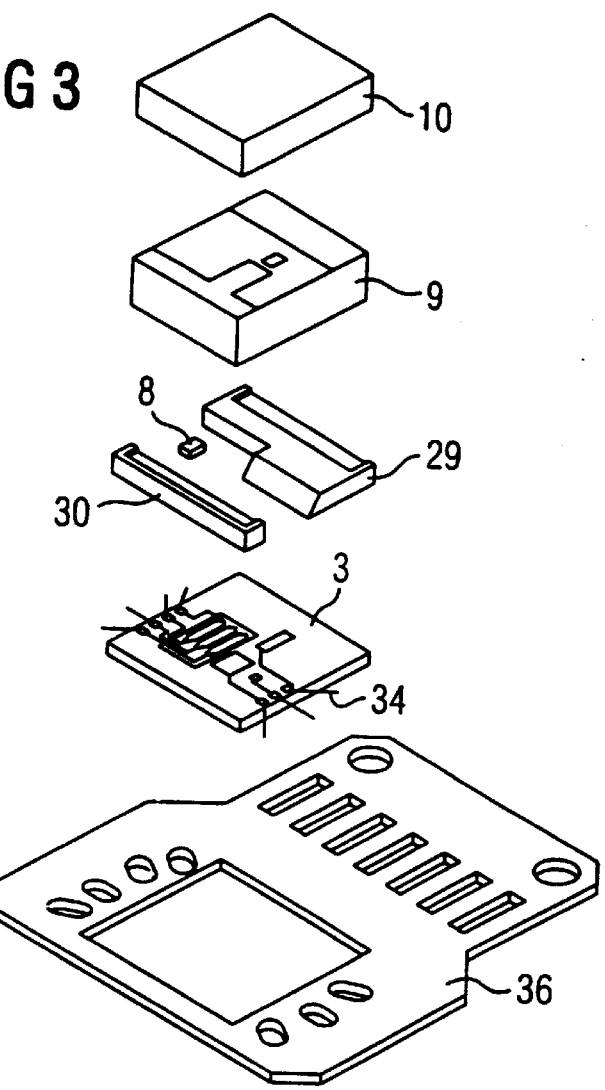
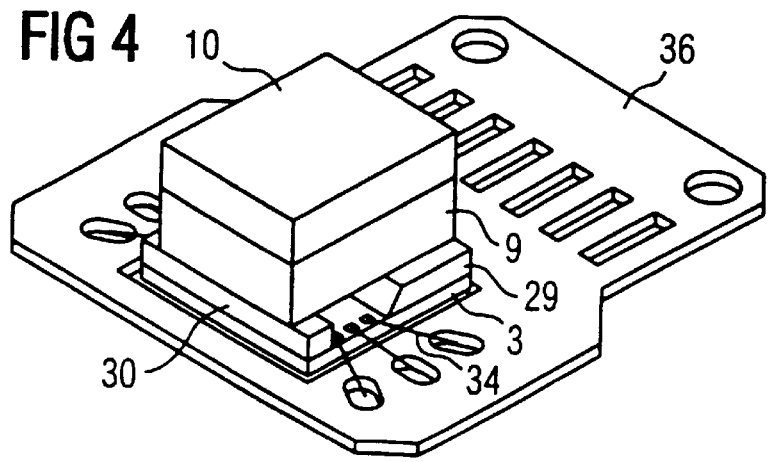

OPTOELECTRONIC SENSOR MODULE

CROSS-REFERENCE TO RELATED APPLICATION

This application is a continuation of copending International Application No. PCT/DE98/03186, filed Oct. 30, 1998, which designated the United States.

BACKGROUND OF THE INVENTION

Field of the Invention

The invention relates to an optoelectronic sensor module, in particular for use in magnetic read/write heads in magnetic recording and/or reproducing devices.

The growing complexity of available computer programs and the constantly increasing quantities of data to be stored make it necessary to develop storage media with greater and greater storage capacity. As an example, one possibility for increasing the storage capacity of a floppy-disk of the prior art (which is based on a magnetic storage technique) would be placing tracks on which information on the magnetic storage medium of the floppy disc is stored, in such a way that the tracks are closer together.

In currently available floppy-disk drives with mechanical control of a magnetic read/write head, the tracks on the storage medium are separated by approximately 100 $\mu$m. A significant reduction of that separation, e.g. by a factor of 100 (which would lead to a 100-fold increase in the storage capacity of the magnetic storage medium) is not possible using magneto-mechanical tracking of the prior art. However, suitably precise tracking is possible opto-mechanically and has been used successfully for a number of years in compact disk (CD) drives. In that technique a laser beam is focussed onto the relevant disk surface and reflected back therefrom onto a suitable detector. In accordance with a pattern of lines or points on the disk which appropriately modifies the reflecting behavior of the disk, a modulated electrical signal is produced at the detector and can be used not only for data transfer but also for track recognition and tracking. That technique enables track separations in the $\mu$m range to be realized.

Semiconductor components for use in optical read/write heads of optical recording and reproduction devices are known, for example, from European Patent Application 0 199 565 A3. Each of the components described therein involves integration in a silicon wafer of two photodetectors, namely a signal detector for receiving optical signals reflected from a CD and a monitor detector for monitoring a power output of an associated semiconductor laser chip.

The two photodetectors are disposed one behind the other as seen in the radiating direction of the semiconductor laser chip and lie on a beam axis of a laser beam emitted by the semiconductor laser chip. A semitransparent routing mirror disposed above the signal detector allows a small part of the radiation emitted by the semiconductor laser chip through to the monitor detector and deflects a larger part of the laser radiation away from the silicon wafer by reflecting it through 90°. The reflected laser radiation reaches the CD, is reflected back to the semiconductor laser component according to the reflection pattern on the CD, passes through the semitransparent routing mirror and strikes the signal detector disposed beneath it.

However, that configuration has two disadvantages. Firstly, a laser radiation coming from the semiconductor chip and scattered by the semitransparent routing mirror strikes the signal detector directly and interferes with the optical signal reflected from the optical data storage medium. Secondly, the fabrication of semitransparent mirrors with characteristics adequate for that application is very difficult.

A known proposal exists for combining an opto-magnetic tracking with a magnetic read/write head of a magnetic storage device. That proposal includes fixing next to each other on the mechanically moved carrier arm of the read/write head, the laser source as a discrete component in the form of a semiconductor laser chip in a metallic TO packing (diameter approximately 5 mm), and the necessary beam shape and beam control optics and the associated detectors, which are also mounted in discrete metallic TO packings. However, that layout of the laser source with the associated detectors and the optical components on the carrier arm of the magnetic read/write head leads to a significant increase in both the size and the mass of the carrier arm. That results in two decisive disadvantages:

Firstly, the mobility of the arm is limited as a result of its greater inert mass and the subsequently higher acceleration forces necessary for moving it, resulting in a longer access time to the data tracks of the magnetic storage medium and therefore in a longer data access time.

Secondly, the TO components of the semiconductor laser chip and the detectors increase the dimensions of the total layout to such an extent that the standard case height of 1 inch can no longer be achieved. An opto-magnetic floppy-disk drive constructed according to that technique can therefore not directly replace magnetic floppy-disc drives of the prior art since it cannot be installed in the standard drive bay of a personal computer, let alone that of a laptop computer.

An optical sensor module is known, for example, from U.S. Pat. No. 4,958,245. That device serves for determining the position of a carrier head in relation to a magnetic data carrier and has an infrared light emitting diode, a collection lens, a routing mirror and a photodetector as separate components, which are disposed in a separate housing. The space requirement and the mass of that sensor module are also relatively large.

SUMMARY OF THE INVENTION

It is accordingly an object of the invention to provide an optoelectronic sensor module, which overcomes the hereinafore-mentioned disadvantages of the heretofore-known devices of this general type, which has a low mass, a low space requirement and a reduced susceptibility to interference caused by scattered laser radiation, which permits economical mass production and which can be mounted by using prior art assembly plants.

With the foregoing and other objects in view there is provided, in accordance with the invention, an optoelectronic sensor module for recognition of reflection patterns on a magnetic data carrier, the sensor module comprising a cooling element having a first principal surface; a laser emitter component fixed on the first principal surface, emitting a laser radiation along a laser radiation axis during operation, and having electrical connections and a given side opposite the cooling element; at least one first sensor photodetector formed in the cooling element for reading out track data, laterally displaced relative to the laser radiation axis, adjacent the laser emitter component and having electrical connections; electrically conducting bond pads formed or deposited at the first principal surface; mutually electrically insulated electrical conducting paths formed or deposited at the first principal surface, the conducting paths connecting the bond pads with the electrical connections of the laser emitter component and the sensor photodetector; a lens configuration disposed at the given side of the laser emitter component; and at least one supporting web fixing the lens configuration to the cooling element; the laser radiation having at least one first part decoupled from the sensor module directly or after a deflection by a reflecting element, through the lens configuration, at least partly reflected back to the sensor photodetector by a reflection pattern on a magnetic data carrier disposed outside the sensor module and received by the sensor photodetector.

At least part of the decoupled laser radiation is modulated by the reflection pattern on the magnetic data carrier disposed outside the sensor module, reflected back to the sensor module and received by the sensor module.

The problem described above of too great a mass and too great a height is solved through the optoelectronic sensor module according to the invention in that the sensor photodetector, the laser emitter component, the conducting paths for these electronic components, the bond pads and the supporting web for the lens configuration are integrally formed (sensor photodetector) or disposed on a single cooling element and thus combined in a minimum of space.

Interfering scattered laser radiation is reduced through the fact that the sensor photodetector does not lie on the radiation axis of the laser emitter element but is positioned to one side thereof.

In accordance with another feature of the invention, the cooling element is a supporting plate essentially of silicon in which supporting plate the sensor photodiode is integrally formed. The bond pads and the electrical conducting paths are attached to an insulating layer attached to the supporting plate.

Silicon has very high thermal conductivity and is therefore especially suitable for the cooling element. Advantageously, photodetectors such as photodiodes and phototransistors can be fabricated in silicon in a simple way. The associated technology is actually known and is therefore not discussed herein in detail.

In accordance with a further feature of the invention, the laser emitter component is disposed between a first and a second supporting web which are formed essentially of glass. A bonding layer being formed essentially of amorphous silicon is disposed between each supporting web and the silicon chip and the two supporting webs are fixed to the respective bonding layer through the use of anodic bonding. This construction has the advantage of enabling efficient mass production of the optoelectronic sensor module.

In accordance with an added feature of the invention, there is provided a monitor photodetector formed in the cooling element, the laser radiation emitted by the laser emitter component having at least a second part coupled into the monitor photodetector.

In accordance with an additional feature of the invention, the laser emitter component is an edge emitter; the laser radiation axis runs substantially parallel to the principal surface of the cooling element; and a mirror surface is disposed downstream of the laser emitter component along the laser radiation axis, the mirror surface facing the laser emitter component, facing away from the principal surface, cutting the emitted radiation axis at an angle of approximately 45°, and deflecting the one part of the laser radiation during operation in a direction substantially perpendicular to the principal surface.

In accordance with yet another feature of the invention, the radiation direction of the laser emitter component is directed onto the first supporting web; and the first supporting web has a lateral surface with a part facing the laser emitter component, struck by the laser radiation, inclined relative to the radiation axis at an angle of approximately 45° and having a mirror surface.

In accordance with a concomitant feature of the invention, the mirror surface is semitransparent, the monitor photodetector is disposed beneath the first supporting web and beneath the laser radiation axis, the first part of the laser radiation is reflected by the mirror surface towards the lens configuration, and the second part of the laser radiation is refracted at the mirror surface towards the monitor photodetector.

Other features which are considered as characteristic for the invention are set forth in the appended claims.

Although the invention is illustrated and described herein as embodied in an optoelectronic sensor module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an exploded perspective view of the exemplary embodiment, which is dismantled into its constituent parts; and FIG. 4 is a perspective view of the exemplary embodiment mounted on a leadframe.

DESCRIPTION OF THE PREFERRED EMBODIMENTS

Figure 1:
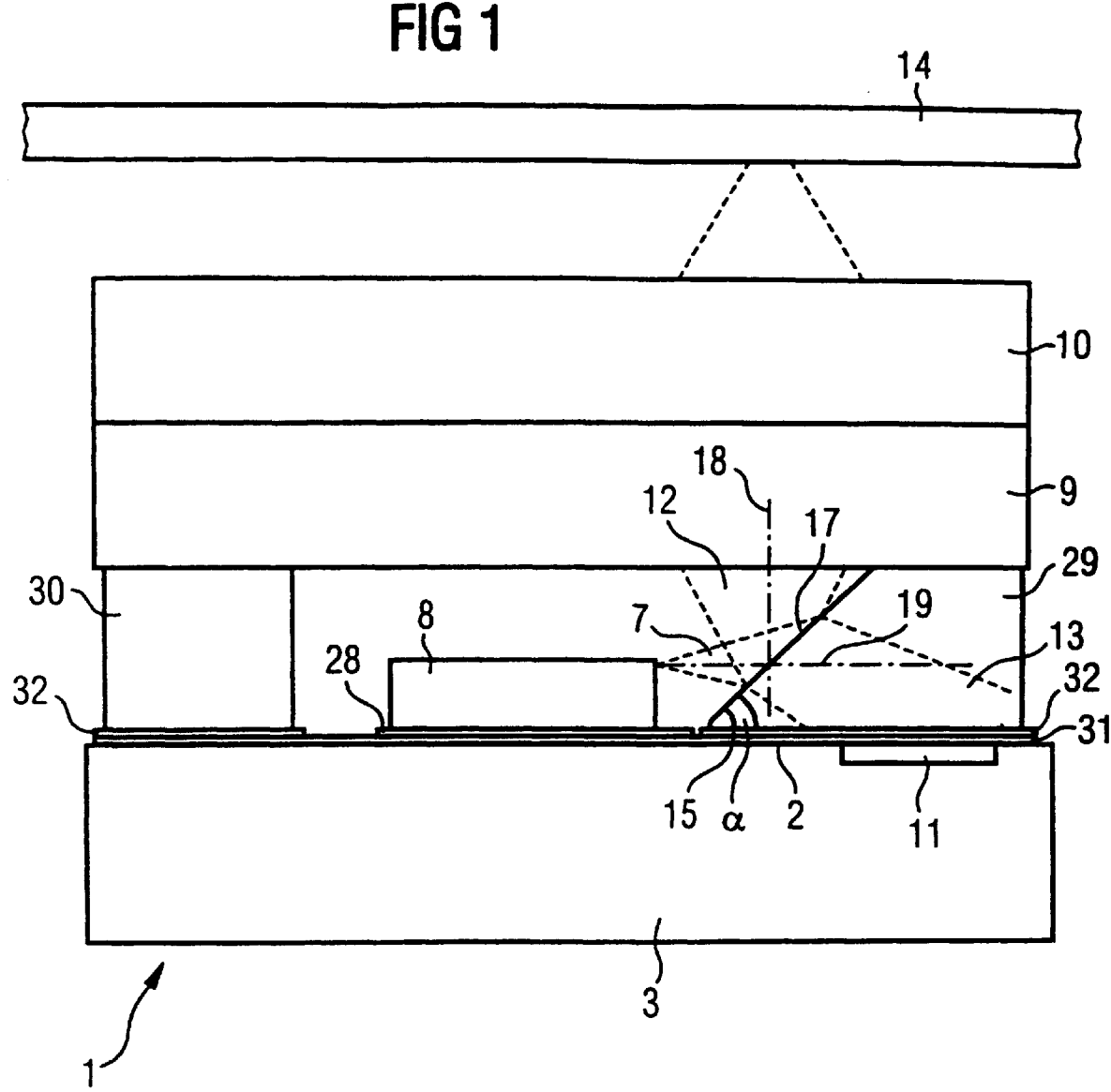
FIG. 1 is a fragmentary, diagrammatic, sectional view of an exemplary embodiment of the invention.

Referring now to the figures of the drawings in detail and first, particularly, to FIG. 1 thereof, there is seen a sectional view of an exemplary embodiment a sensor module 1 of the invention having an edge emitting semiconductor laser chip 8 fixed on a first principal surface 2 of a silicon submount (silicon substrate) 3 which in this case represents a cooling element 3. A radiation axis 19 of a laser beam 7 emitted by the semiconductor laser chip 8 during operation of a sensor runs essentially parallel to the first principal surface 2 of the silicon submount 3. A first supporting web 29 and a second supporting web 30, for example in the form of glass strips, are fixed on the silicon submount 3, at mutually opposite sides of the semiconductor laser chip 8. The radiation axis 19 is essentially perpendicular to a direction of longitudinal extension of the supporting webs 29, 30 but cuts at least the supporting web 29 of the two supporting webs 29, 30. The supporting web 29 has a lateral surface 15 formed as a mirror surface 17, in at least one area in which the laser beam 7 strikes the supporting web 29. The mirror surface 17 includes an angle α nof essentially 45° with the first principal surface 2 of the silicon submount 3 and faces away from that surface 2 so that the laser beam 7 is deflected through 90° away from the silicon submount 3. The mirror surface 17 is formed to be semitransparent so that not all of the laser radiation 7 emitted from the semiconductor chip 8 is reflected. Only a first part 12 of that radiation 7 is reflected and a second part 13 is refracted at the mirror surface 17 towards the silicon submount 3.

A monitor photodiode 11 is integrally formed in the silicon submount 3 beneath the first supporting web 29 for monitoring the power of the laser radiation 7 emitted by the semiconductor laser chip 8. The photodiode 11 receives at least a part of the second part 13 of the laser radiation 7 refracted at the mirror surface 17. The structure and fabrication of these kinds of photodiodes 11 in silicon wafers is known in semiconductor technology and is therefore not discussed in detail herein.

Figure 2:
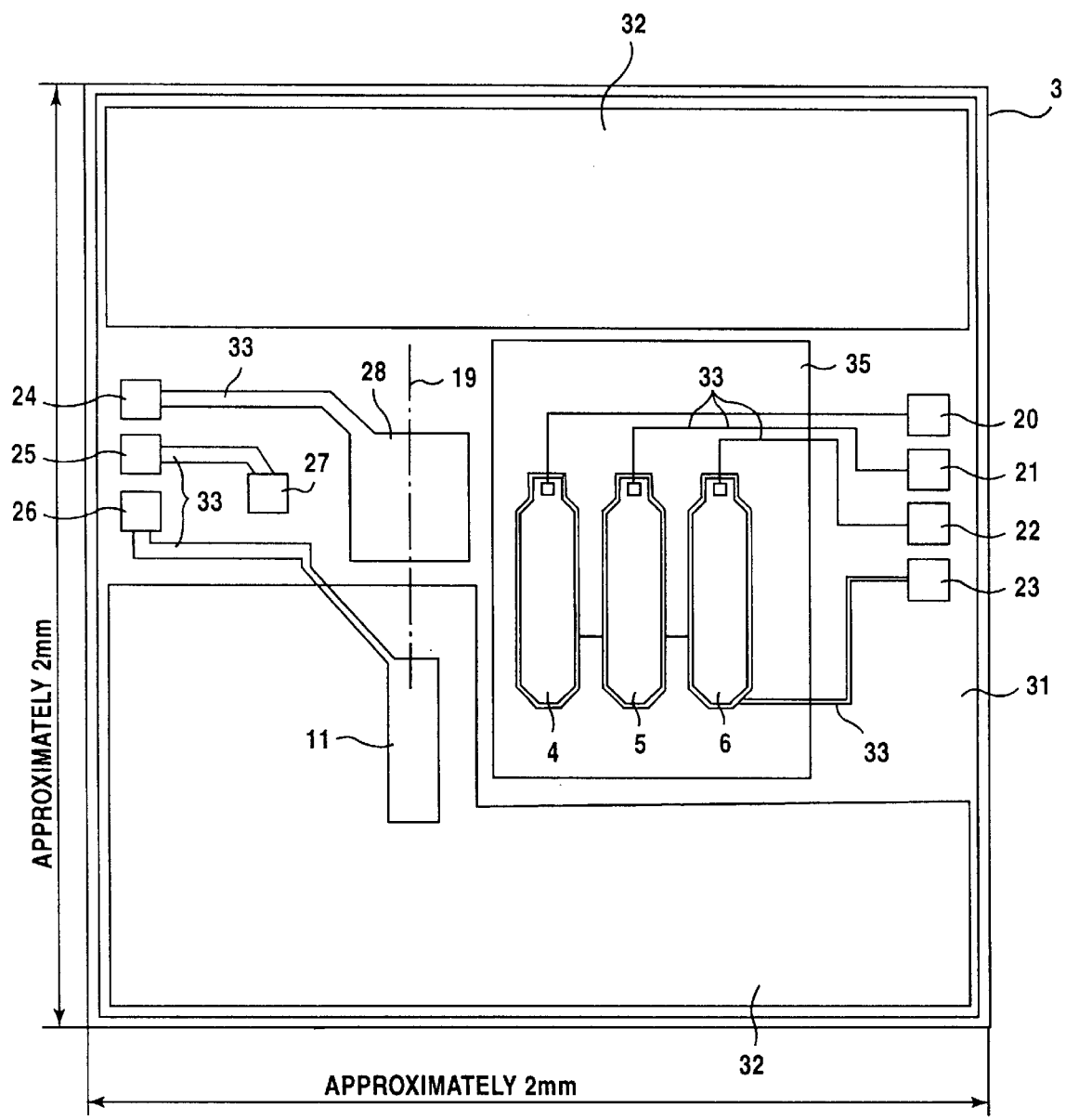
FIG. 2 is a top-plan view of a cooling element of the exemplary embodiment.

Almost the entire first principal surface 2 of the silicon submount 3 carries an insulating layer 31, preferably a layer of silicon nitride. As is seen in FIGS. 2, 3 and 4, conducting paths 33 and electrically conducting bond pads 20–28 for bond wires 34 and the semiconductor laser chip 8 are deposited on the insulating layer 31 between the two supporting webs 29, 30. The conducting paths 33, which preferably are formed of metallization layers (e.g. Ti—Pt—Au), essentially connect electrical connections of electronic components formed or deposited on the submount 3 to the bond pads 20–28.

Three sensor photodiodes 4, 5, 6 disposed next to each other and preferably longitudinally extended and running parallel to each other are integrated in the silicon submount 3, laterally adjacent the semiconductor chip 8 and between the two supporting webs 29, 30. Electrical contacts of the sensor photodiodes 4, 5, 6 are electrically conductively connected through the use of the conducting paths 33 to the bond pads 20–23. The direction of longitudinal extension of the sensor photodiodes 4, 5, 6 runs parallel to the radiation axis 19 of the emitted laser radiation 7.

All of the bond pads 20–26 for the bond wires for external connection of the sensor module 1 are located between the two supporting webs 29, 30 in an edge area of the silicon submount 3.

The three sensor photodiodes 4, 5, 6 are preferably embedded in a shorted photodiode 35.

A bonding layer 32 being formed of amorphous silicon is disposed between each supporting web 29, 30 and the silicon submount 3. These bonding layers 32 serve as a "surface" for anodic bonding of the supporting webs 29, 30 formed of glass. As a result, it is possible to position electrically active components beneath the anodally bonded supporting webs. In this case, this is the monitor diode 11.

A lens configuration including a holographic optical element 9 and a refractive optical element 10 is located on the supporting webs 29, 30. This lens configuration splits the laser radiation 12, which has been deflected through 90°, into several partial beams before it strikes a magnetic storage medium 14 (e.g. a magnetic disk). The partial beams strike a reflection pattern disposed on the storage medium, e.g. a periodic pattern of lines, and are modulated according to the reflection pattern and reflected towards the sensor photodiodes 4, 5, 6. A modulated signal which is thus obtained contains information about the position of a read/write head above the storage medium 14.

The sensor module formed according to the exemplary embodiment is preferably fixed on a leadframe 36 shown in FIGS. 3 and 4, through the use of which it can be fastened in a simple way to an arm of a read/write head.

A surface emitting laser (vertical cavity surface emitting laser (VCSEL)) can also be used in place of the edge emitting semiconductor laser chip 8. In this case, it is possible to dispense with the mirror surface 17 since this laser already radiates in the required direction when normally mounted.

The surface emitting laser can also be constructed in such a way that it does not emit simply a single beam spot, but has two, three or even more beam spots according to the required number of partial beams. This makes it possible to achieve a more favorable energy distribution in the partial beams and to use a technically more simple lens configuration.

We claim:

1. An optoelectronic sensor module for recognition of reflection patterns on a magnetic data carrier, the sensor module comprising:
    a cooling element having a principal surface;
    a laser emitter component fixed on said principal surface, emitting a laser radiation along a laser radiation axis during operation, and having electrical connections and a given side opposite said cooling element;
    at least one sensor photodetector formed in said cooling element, laterally displaced relative to said laser radiation axis, adjacent said laser emitter component and having electrical connections;
    electrically conducting bond pads at said principal surface;
    mutually electrically insulated electrical conducting paths at said principal surface, said conducting paths connecting said bond pads with said electrical connections of said laser emitter component and said sensor photodetector;
    a lens configuration disposed at said given side of said laser emitter component; and
    at least one supporting web fixing said lens configuration to said cooling element;
    said laser radiation having at least one part decoupled from the sensor module through said lens configuration, at least partly reflected back to said sensor photodetector by a reflection pattern on a magnetic data carrier disposed outside the sensor module and received by said sensor photodetector.

2. The optoelectronic sensor module according to claim 1, wherein at least said one part of said laser radiation is directly decoupled from the sensor module.

3. The optoelectronic sensor module according to claim 1, including a reflecting element decoupling at least said one part of said laser radiation from the sensor module after a deflection.

4. The optoelectronic sensor module according to claim 1, wherein said cooling element is a silicon plate in which said sensor photodetector is integrally formed, and an insulating layer is deposited between said silicon plate and said bond pads as well as between said silicon plate and said electrical conducting paths.

5. The optoelectronic sensor module according to claim 2, wherein:
    said at least one supporting web includes first and second supporting webs formed substantially of glass;
    said laser emitter component is disposed between said first and second supporting webs;
    a bonding layer formed substantially of amorphous silicon is disposed between each of said supporting webs and said silicon plate; and
    both of said supporting webs are fixed on said bonding layer by anodic bonding.

6. The optoelectronic sensor module according to claim 1, including a monitor photodetector formed in said cooling element, said laser radiation emitted by said laser emitter component having at least another part coupled into said monitor photodetector.

7. The optoelectronic sensor module according to claim 1, wherein:

said laser emitter component is an edge emitter;

said laser radiation axis runs substantially parallel to said principal surface of said cooling element; and a mirror surface is disposed downstream of said laser emitter component along said laser radiation axis, said mirror surface facing said laser emitter component, facing away from said principal surface, cutting said emitted radiation axis at an angle of approximately 45°, and deflecting said one part of said laser radiation during operation in a direction substantially perpendicular to said principal surface.

8. The optoelectronic sensor module according to claim 5, wherein:

said laser radiation axis runs substantially parallel to said principal surface of said cooling element;

said laser emitter component is an edge emitter directing radiation onto said first supporting web;

said first supporting web has a lateral surface with a part facing said laser emitter component, struck by said laser radiation, inclined relative to said radiation axis at an angle of approximately 45° and having a mirror surface; and said mirror surface is disposed downstream of said laser emitter component along said laser radiation axis, faces said laser emitter component, faces away from said principal surface, cuts said emitted radiation axis at an angle of approximately 45° and deflects said one part of said laser radiation during operation in a direction substantially perpendicular to said principal surface.

9. The optoelectronic sensor module according to claim 8, including a monitor photodetector formed in said cooling element, said laser radiation emitted by said laser emitter component having at least another part coupled into said monitor photodetector.

10. The optoelectronic sensor module according to claim 6, wherein said mirror surface is semitransparent, said monitor photodetector is disposed beneath said first supporting web and beneath said laser radiation axis, said one part of said laser radiation is reflected by said mirror surface towards said lens configuration, and said other part of said laser radiation is refracted at said mirror surface towards said monitor photodetector.

11. The optoelectronic sensor module according to claim 9, wherein said mirror surface is semitransparent, said monitor photodetector is disposed beneath said first supporting web and beneath said laser radiation axis, said one part of said laser radiation is reflected by said mirror surface towards said lens configuration, and said other part of said laser radiation is refracted at said mirror surface towards said monitor photodetector.

* * * * *